April 20, 1971  T. W. PIETROCINI ET AL  3,575,787

PLASTIC BEARING-BUSHING MATERIAL

Filed Jan. 13, 1969  2 Sheets-Sheet 2

INVENTORS
THOMAS W. PIETROCINI
MILTON L. SELKER
BY

ATTORNEY

United States Patent Office 3,575,787
Patented Apr. 20, 1971

3,575,787
PLASTIC BEARING-BUSHING MATERIAL
Thomas W. Pietrocini, Wickliffe, and Milton L. Selker,
Shaker Heights, Ohio, assignors to Clevite Corporation
Filed Jan. 13, 1969, Ser. No. 790,769
Int. Cl. B32b 27/08, 15/02; B29d 31/02
U.S. Cl. 161—165
12 Claims

ABSTRACT OF THE DISCLOSURE

A steel backed plastic bearing-bushing material having a polyimide bearing surface provided with cavities which are filled with polytetrafluorethylene and a metal bearing phase.

---

The invention relates generally to bearing-bushing materials and, more particularly, to a material in which the surface layer is composed of a plastic-like material.

In the prior art, it is already known to utilize polytetrafluorethylene for bearing purposes although in actual use it has been shown that such material possesses a high coefficient of thermal expansion and, when used by itself, has very poor creep resistance. Moreover, such materials are limited to applications wherein the surface speed does not appreciably exceed 100 feet per minute.

In order to overcome these disadvantages and limitations while still retaining the recognized lubricity characteristics of polytetrafluorethylene (hereinafter referred to as PTFE) it has already been proposed to infiltrate, or impregnate, a porous metal matrix with PTFE and a bearing phase. In practice, however, it has been found that the impregnation of the metal matrix with the bearing phase involves considerable expense due, in part, to the time-consuming effort required in such a method. Furthermore, difficulties have been encountered with the wear and abrasion characteristics of the metal matrix material due to the metallic contact between the shaft and the bearing surface which is susceptible to seizure and causes elevated temperatures which deleteriously affect the PTFE.

It has now been found that improved wear properties are obtainable with a particular plastic film in which macroscopic perforations or indentations are filled with PTFE and a bearing phase material so that the whole provides the strength of a continuous matrix. The plastic film is formed of polyimide which has a natural lubricity and a load carrying capacity which is comparatively greater than that of conventional metallic matrixes inasmuch as the normal temperatures generated at the bearing surface are not as high. Heat distortion tests of the type based on analysis D–648 of the American Society for Testing Materials, have shown that even plastics which have a relatively high heat distortion temperature (at 264 p.s.i.), such as phenylene oxide and polysulfone, have a limited test life of less than one hour. Such popular plastics as, for instance, polytetrafluorethylene (Teflon) and polyamide (nylon) are similarly unsuitable to accomplish the purposes of this invention due to a lack of structural strength to provide the necessary load carrying capacity. For further reference see "Machine Design-Reference Issue Plastics," June 16, 1966, volume 38, Penton Publishing.

The macroscopic cavities, perforations or indentations can be filled by a slurry process, or siimlar low cost application. The requirement for vacuum impregnation or infiltration which is necessary for producing the prior art bearing material is obviated.

Additionally, it has been found that polyimide has superior anti-friction characteristics and in many ways resembles steel under lubricated applications and may be thus usable for automotive applications in which a cold start of an engine frequently occurs without an oil film.

Investigations have led to the conclusion that any substantial addition of additives or other materials to the polyimide matrix will considerably reduce the usefulness of the material. For example, it was found that a polyimide film containing 30 volume percent PTFE telomer, uniformly dispersed throughout the polyimide material, leads to a structurally weak matrix material wholly unsuitable for high load bearing applications.

Furthermore, it has been shown that the addition of lead to the PTFE filler material establishes a wear resistance which has unique properties due, apparently, to the fact that the lead acts as an adhesive retarding the wear loss due to leakage. Furthermore, the lead addition aids in the development of a transfer coating on the rotatable member which, in most instances, is a steel shaft.

The cavities, as has already been alluded to above, may be in the form of perforations or mechanically imparted indentation. However, the invention is not limited thereto inasmuch as a foam-like, porous or similar structure may be utilized as long as the maximum surface area of the filler does not exceed about 40 percent to avoid a lowering of the load carrying capacity. The lower minimum filler surface area is substantially between 10 and 15 percent of the total area. A reduction below this minimum causes poor surface action leading to high wear, insufficient supply of solid lubricant to maintain on the surface a coherent film.

The term "macroscopic" as used herein refers to openings having or approximating a diameter of .010 to .250 inch. The upper limit arises from practical limitations for bearing-bushing applications. Whereas cavities below .010 inch in diameter establishes a distribution which is too fine and tends to weaken the polyimide matrix.

The term "cellular" as used herein encompasses structures that are porous, foam-like or have honeycomb characteristics, and in turn the term "cavities" is used to include cellular structures.

An aspect of the present invention resides in the provision of a bearing-bushing material having a matrix layer formed essentially of polyimide. The layer has dispersed macroscopic cavities in the outer surface which are filled up with polytetrafluorethylene and a conventional metal bearing phase.

It is therefore the primary object of this invention to provide a new bearing-bushing material with superior anti-friction characteristics and which can be produced more economically than prior art materials of the type discussed above.

For a better understanding of the present invention, together with other and further objects thereof, reference is had to the following description taken in connection with the accompanying drawings, and its scope will be pointed out in the appended claims.

Figure 1:
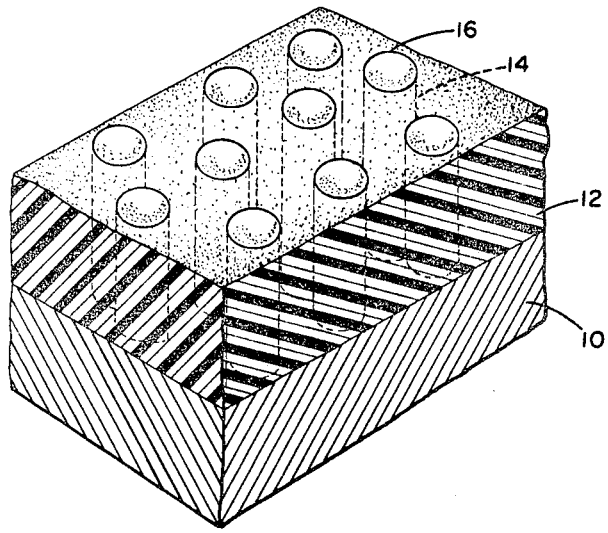
FIG. 1 is a diagrammatic sectional view of a plastic matrix and a metal backing thereof.
Figure 4:
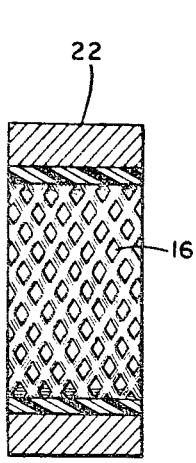
FIGS. 4 to 10 illustrate bushings, in cross-section, having a variety of differently shaped surface configurations in accordance with this invention.
Figure 5:
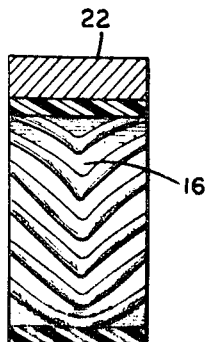
Figure 6:
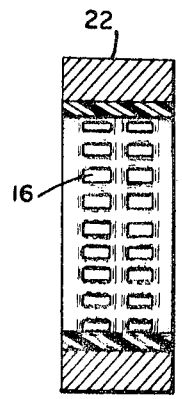
Figure 7:
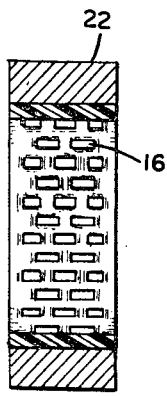

Referring now to FIG. 1, there is shown a conventional metal backing member 10 and a bearing surface matrix 12 composed of polyimide. The matrix 12 is relatively thin and, more particularly, the polyimide layer is, preferably, .002 to .007 inch in thickness which is bonded to the metal backing or substrate, preferably steel, through the use of a plastic type adhesive such as acrylic-epoxide. The plastic, i.e., polyimide, matrix 12 is either perforated or indented, but in any event, provided with numerous cavities 14 to receive a filler 16 composed of a solid lubricant and a bearing phase.

In the preferred embodiment, the filler 16 is composed of 50 weight percent PTFE and 50 weight percent lead although such proportions may be slightly varied. The lead addition can be in the form of a lead alloy in which the alloy constituents are selected from materials such as cadmium, gallium, tin and/or indium in a proportion of less than 10% of the total lead base material. The cadmium and gallium additions are preferred in amounts of 3 weight percent each, indium about 6 weight percent, and tin about 6 to 10 weight percent. Zinc may be used as an alternate base material.

The filler material 16, composed of the bearing phase and the solid lubricant, is, in another embodiment of this invention, smeared upon the bearing surface of the polyimide matrix 12 to provide a thin overlay on said surface in the range of .0002 to .0020 inch.

A method for making the bearing material in accordance with this invention is as follows:

EXAMPLE NO. 1

The polyimide matrix 12 is bonded to the metal substrate 10 by means of nip roll lamination at 425° F. using a .0005 inch layer of acrylic-epoxide adhesive, and thereafter a metal roller provided with projections is passed over the film to establish indentations 14 (which may be either uniform as shown in FIG. 1 or irregularly arranged). A slurry composed of PTFE and lead is blended into a polyimide liquid binder solution and applied to the surface, in slurry form, so that the indentations are filled and a thin overlay in the range of .0002 to .0020 inch is left on the surface. The resulting composite is then cured at a temperature of 200° F. for a period of 16 hours to insure continuity by the bearing phase constituents and the polyimide film.

EXAMPLE NO. 2

The method is the same as described in Example No. 1 except that 90 weight percent of lead-10 weight percent tin powder particles is blended together with the PTFE to form the filler matrix.

EXAMPLE NO. 3

The method is the same as described in Example No. 1 except that 94 weight percent of lead-6% indium is blended together with the PTFE to form the filler matrix.

Figure 3:
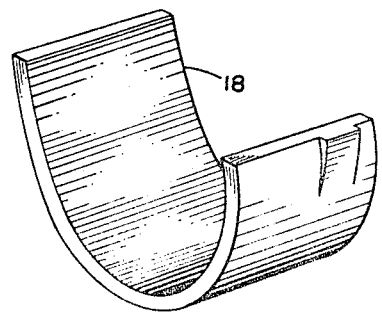
FIG. 3 is a perspective view of a typical bushing formed of the bearing-bushing material.
Figure 2:
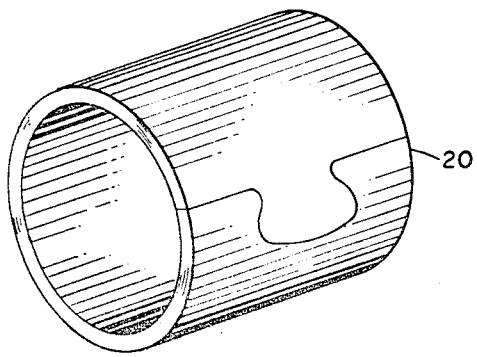
FIG. 2 is a perspective view of a typical bearing structure formed of the bearing-bushing material.
Figure 8:
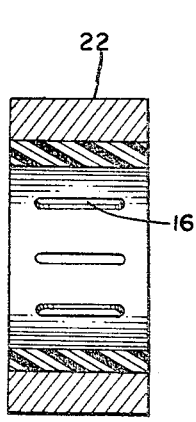
Figure 9:
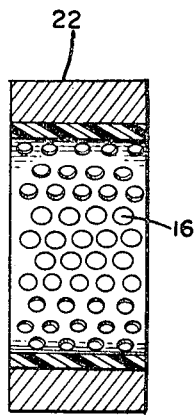
Figure 10:
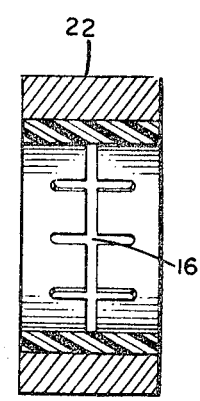

FIGS. 2 and 3 show a typical bearing 18 and bushing 20, respectively, for which the above described material is intended.

FIGS. 4 to 10 show a bushing 22 having cavities of different configurations that are filled up with filler material 16.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

In the claims:

1. A bearing-bushing material comprising: a matrix layer formed essentially of polyimide, said layer having dispersed macroscopic cavities in the outer surface thereof; a filler consisting essentially of polytetrafluoroethylene and a metal bearing phase, said cavities being completely filled up with said filler.

2. A bearing-bushing material according to claim 1, wherein said matrix layer is a cellular structure.

3. A bearing-bushing material according to claim 1, wherein said filling is composed of about 50 weight percent polytetrafluoroethylene and 50 weight percent lead.

4. A bearing-bushing material according to claim 1, and a thin overlay of .0002 to .0020 inch of the filling material on the surface of the matrix layer.

5. A bearing-bushing material according to claim 1, wherein the surface area exposing the filler material is between 10 and 40 percent.

6. A bushing made of material according to claim 1.

7. A bearing made of material according to claim 1.

8. A bearing-bushing material according to claim 1, wherein at least 90 weight percent of the bearing phase is selected from a group consisting essentially of lead and zinc and the remainder is selected from a group of alloying constituents consisting essentially of tin, gallium, cadmium and indium.

9. A bearing-bushing material according to claim 8, wherein the alloying material includes approximately 6 weight percent indium.

10. A bearing-bushing material according to claim 8, wherein the alloying material includes approximately 3 weight percent cadmium.

11. A bearing-bushing material according to claim 8, wherein the alloying material includes approximately 3 weight percent gallium.

12. A bearing-bushing material according to claim 8, wherein the alloying material includes approximately 6 to 10 weight percent tin.

References Cited

UNITED STATES PATENTS

| | | | |
|---|---|---|---|
| 2,964,476 | 12/1960 | Coad | 252—26 |
| 3,053,593 | 9/1962 | Blair et al. | 308—238 |
| 3,067,135 | 12/1962 | Strub | 252—12 |
| 3,072,449 | 1/1963 | Morley et al. | 308—238 |
| 3,094,585 | 6/1963 | Rudner | 174—77 |
| 3,218,255 | 11/1965 | Pratt | 161—189X |
| 3,408,453 | 10/1968 | Shelton | 174—110X |
| 3,455,774 | 7/1969 | Lindsey et al. | 161—189 |
| 2,798,005 | 7/1957 | Love | 117—8 |
| 2,815,253 | 12/1957 | Spriggs | 308—238 |

OTHER REFERENCES

Soviet Union Publication, "Powder Metallurgy and Metal Ceramics" (Poroshkovaya Metallurgiya), Issue No. 10, October 1965, pp. 65 et seq.

HAROLD ANSHER, Primary Examiner

U.S. Cl. X.R.

161—189, 227; 308—238